United States Patent
Kim

(10) Patent No.: US 7,060,392 B2
(45) Date of Patent: Jun. 13, 2006

(54) NON-AQUEOUS ELECTROLYTE AND A LITHIUM SECONDARY BATTERY COMPRISING THE SAME

(75) Inventor: Jin-Sung Kim, Cheonan-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 133 days.

(21) Appl. No.: 10/869,437

(22) Filed: Jun. 17, 2004

(65) Prior Publication Data

US 2004/0265702 A1 Dec. 30, 2004

(30) Foreign Application Priority Data

Jun. 27, 2003 (KR) .................. 10-2003-0042557

(51) Int. Cl.
*H01M 10/40* (2006.01)
(52) U.S. Cl. .............. 429/340; 429/324; 429/326; 429/332
(58) Field of Classification Search ............. None
See application file for complete search history.

(56) References Cited

U.S. PATENT DOCUMENTS

2005/0042521 A1* 2/2005 Hamamoto et al. ......... 429/332

FOREIGN PATENT DOCUMENTS

| JP | 06-333596 | 12/1994 |
|---|---|---|
| JP | 07-320779 | 12/1995 |
| JP | 08-064238 | 3/1996 |
| JP | 08-321312 | 12/1996 |
| JP | 09-073918 | 3/1997 |

OTHER PUBLICATIONS

Sid Megahed et al., "Lithium-ion rechargeable batteries", Journal of Power Sourcess, 51 pp. 79-104; Elsevier Science S.A. in 1994 no month.
C.R. Yang et al., "Composition analysis of the passive film on the carbon electrode of a lithium-ion battery with an EC-based electrolyte", Journal of Power Sources, 72 pp. 66-70; Elsevier Science S.A. in 1998 no month.

\* cited by examiner

*Primary Examiner*—John S. Maples
(74) *Attorney, Agent, or Firm*—Robert E. Bushnell, Esq.

(57) ABSTRACT

An electrolyte for a lithium secondary battery comprises lithium salts, a non-aqueous organic solvent, and an additive compound of formula (1):

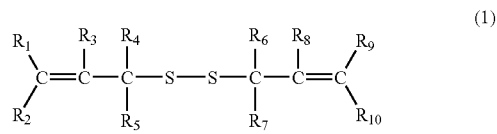

where $R_1$ to $R_{10}$ are independently selected from the group consisting of a hydrogen, alkyl, alkenyl, and alkynyl. The additive compound decomposes earlier than organic solvent to form an SEI film, and prevents decomposition of the organic solvent.

20 Claims, 2 Drawing Sheets

NON-AQUEOUS ELECTROLYTE AND A LITHIUM SECONDARY BATTERY COMPRISING THE SAME

CLAIM OF PRIORITY

This application makes reference to, incorporates the same herein, and claims all benefits accruing under 35 U.S.C. §119 from an application for NON-AQUEOUS ELECTROLYTE AND A LITHIUM SECONDARY BATTERY COMPRISING THE SAME, earlier filed in the Korean Intellectual Property Office on Jun. 27, 2003 and there duly assigned Ser. No. 2003-42557.

BACKGROUND OF THE INVENTION

1. Field of the Invention

The present invention relates to a non-aqueous electrolyte and a lithium secondary battery comprising the same, and more particularly, to a non-aqueous electrolyte for a lithium secondary battery capable of preventing the thickness of the battery from swelling when it is charged at room temperature or stored at a high temperature, and a lithium secondary battery comprising the same.

2. Description of the Related Art

The use of portable electronic instruments is increasing as electronic equipment gets smaller and lighter due to developments in high-tech electronic industries. Studies on lithium secondary batteries are actively being pursued in accordance with the increased need for a battery having high energy density for use as a power source in these portable electronic instruments. Lithium secondary batteries use materials that reversibly intercalate or deintercalate lithium ions during charge and discharge reactions for both positive and negative active materials. The positive active materials include lithium metal oxide, and the negative materials include lithium metals, lithium-containing alloys, or materials that are capable of reversible intercalation/deintercalation of lithium ions such as crystalline or amorphous carbons, or carbon-containing composites.

Lithium secondary batteries are classified as lithium ion batteries, lithium ion polymer batteries, and lithium polymer batteries according to kinds of separator and electrolyte, and as cylindrical, prismatic, and coin-type batteries according to their shapes. A cross-sectional view of a general prismatic non-aqueous Li-ion cell is shown in FIG. 1. The Li-ion cell 3 is fabricated by inserting an electrode assembly 4 including a positive electrode 5, a negative electrode 6, and a separator 7 between the positive and negative electrodes, into a battery case 8, injecting electrolyte into the upper part of the battery case 8, and sealing the upper part of the case 8 with a cap plate 11.

The average discharge voltage of a lithium secondary battery is about 3.6 to 3.7V, which is higher than those of other alkali batteries such as Ni-MH batteries, and Ni—Cd batteries. An electrolyte that is electrochemically stable in the charge and discharge voltage range of 0 to 4.2V is required in order to generate such a high driving voltage. As a result, a mixture of non-aqueous carbonate-based solvents, such as ethylene carbonate, dimethyl carbonate, and diethyl carbonate, is used as an electrolyte. However, such an electrolyte has significantly lower ion conductivity than an aqueous electrolyte that is used in a Ni-MH battery or a Ni—Cd battery, thereby resulting in the deterioration of battery characteristics during charging and discharging at a high rate.

During the initial charge of a lithium secondary battery, lithium ions, which are released from the lithium-transition metal oxide positive electrode of the battery, are transferred to a carbon negative electrode where the ions are intercalated into the carbon. Because of its high reactivity, lithium reacts with the carbon negative electrode to produce $Li_2CO_3$, LiO, LiOH, etc., thereby forming a thin film on the surface of the negative electrode. This film is referred to as an organic solid electrolyte interface (SEI) film. The organic SEI film formed during the initial charge not only prevents the reaction between the lithium ions and the carbon negative electrode or other materials during charging and discharging, but it also acts as an ion tunnel, allowing the passage of only lithium ions. The ion tunnel prevents disintegration of the structure of the carbon negative electrode, which is caused by co-intercalation of organic solvents having a high molecular weight along with solvated lithium ions into the carbon negative electrode.

Once the organic SEI film is formed, lithium ions do not react again with the carbon electrode or other materials, such that an amount of lithium ions is maintained. That is, carbon of the negative electrode reacts with an electrolyte during the initial charging, thus forming a passivation layer such as an organic SEI film on the surface of the negative electrode such that the electrolyte solution no longer decomposes, and stable charging and discharging are maintained (*J. Power Sources*, 51(1994), 79–104). Because of these reasons, in the lithium secondary battery, there is no irreversible formation reaction of the passivation layer, and a stable cycle life after the initial charging reaction is maintained.

However, gases are generated inside the battery due to decomposition of a carbonate-based organic solvent during the organic SEI film-forming reaction (J. Power Sources, 72(1998), 66–70). These gases include $H_2$, CO, $CO_2$, $CH_4$, $C_2H_6$, $C_3H_6$, etc., depending on the type of non-aqueous organic solvent and negative active material used. The thickness of the battery increases during charging due to the generation of gas inside the battery.

The passivation layer is slowly disintegrated by electrochemical energy and heat energy, which increases with the passage of time when the battery is stored at a high temperature after it is charged. Accordingly, a side reaction in which an exposed surface of the negative electrode reacts with surrounding electrolyte occurs continuously. The internal pressure of the battery increases with this generation of gases, inducing the deformation of prismatic batteries or pouch batteries. As a result, regional differences in the cohesion among electrodes inside the electrode assembly, which is comprised of a positive electrode and a negative electrode, and a separator, occur, thereby deteriorating the performance and safety of the battery and making it difficult to mount the lithium secondary battery set into electronic equipment.

For solving the internal pressure problem, there is disclosed a method in which the safety of a secondary battery including a non-aqueous electrolyte is improved by mounting a current breaker or a vent for ejecting internal electrolyte solution when the internal pressure is increased above a certain level. However, the disadvantage of this method is that mis-operation of the current breaker or the fan may result from an increase in internal pressure itself.

The method in which the SEI-forming reaction is changed by injecting additives into an electrolyte so as to improve the characteristics of the battery is known. For example, Japanese Patent Laid-open No. 97-73918 discloses a method in which high temperature storage characteristics of a battery are improved by adding 1% or less of a diphenyl picrylhydrazyl compound to the electrolyte. Japanese Patent Laid-open No. 96-321312 discloses a method in which cycle life and long-term storage characteristics are improved by using 1 to 20% of an N-butyl amine based compound in an electrolyte. Japanese Patent Laid-open No. 96-64238 discloses a method in which storage characteristics of a battery are improved by adding $3\times10^{-4}$ to $3\times10^{-2}$ M of a calcium salt to the electrolyte. Japanese Patent Laid-open No. 94-333596 discloses a method in which storage characteristics of a battery are improved by adding an azo-based compound to inhibit the reaction between an electrolyte and a negative electrode of the battery. In addition, Japanese Patent Laid-open No. 95-320779 discloses a method in which $CO_2$ is added to an electrolyte, and Japanese Patent Laid-open No. 95-320779 discloses a method in which sulfide-based compounds are added to an electrolyte in order to prevent the electrolyte from decomposing.

The above-mentioned methods induce the formation of an appropriate film such as an organic SEI firm on a negative electrode surface by adding a small amount of organic or inorganic materials to improve the storage characteristics and safety of a battery. However, the disadvantages of the above-mentioned methods are that: the added compound is decomposed or forms an unstable film by interacting with the carbon negative electrode during the initial charge and discharge due to inherent electrochemical characteristics, resulting in the deterioration of the ion mobility in electrons; and gas is generated inside the battery such that there is an increase in internal pressure, resulting in significant deterioration of the storage, safety, cycle life, and capacity characteristics of the battery.

SUMMARY OF THE INVENTION

It is therefore an object of the present invention to solve the problems stated above.

It is also an object of the present invention to provide an improved non-aqueous electrolyte for a lithium secondary battery.

It is further an object of the present invention to provide a non-aqueous electrolyte comprising organic sulfide compounds that are capable of inhibiting the generation of gas inside the battery which is caused by decomposition of a carbonate-based solvent at initial charging.

It is still an object of the present invention to provide a lithium secondary battery that undergoes almost no variation in thickness when the battery is charged at room temperature or when the battery is stored at a high temperature after charging.

These and other objects may be achieved by an electrolyte for a lithium secondary battery comprising a lithium salt, a non-aqueous organic solvent, and a compound represented by Formula (1):

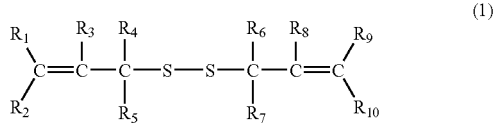

(1)

where $R_1$ to $R_{10}$ are independently selected from the group consisting of a hydrogen, alkyl, alkenyl, and alkynyl.

The present invention also provides a lithium secondary battery comprising a positive electrode including a material that is capable of reversible intercalation/deintercalation of the lithium ions as a positive active material;

a negative electrode including a lithium metal, a lithium-containing alloy, or a material that is capable of reversible intercalation/deintercalation of lithium ions as a negative active material; and an electrolyte including a lithium salt, a non-aqueous organic solvent, and an additive compound represented by the above formula (1).

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
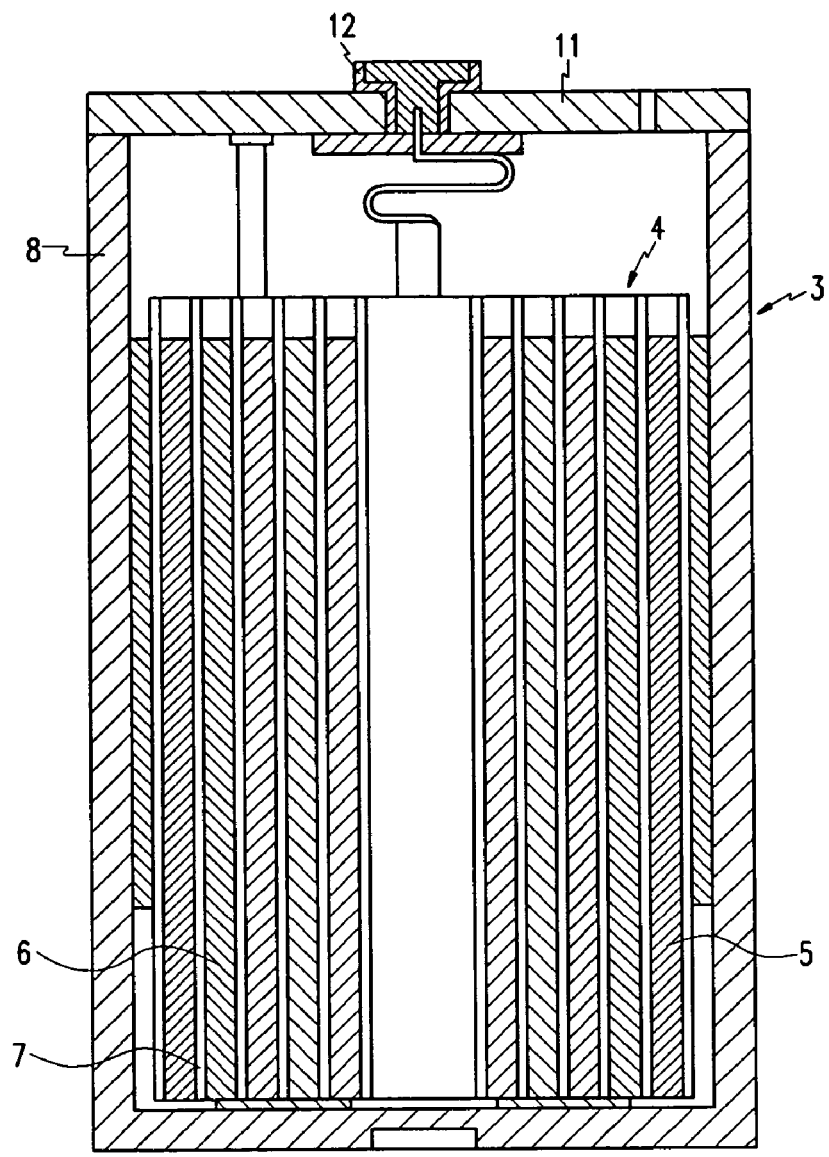
FIG. 1 is a cross-sectional view of a prismatic lithium secondary battery cell.

In the following detailed description, embodiments of the invention are shown and described, simply by way of illustration of the best mode contemplated by the inventors of carrying out the invention. As will be realized, the invention is capable of modification in various respects, all without departing from the invention. Accordingly, the drawings and description are to be regarded as illustrative in nature, and not restrictive.

The electrolyte of a lithium secondary battery comprises lithium salts, a non-aqueous organic solvent, and an additive compound of formula (1).

The lithium salt is preferably at least one selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein x and y are natural numbers), LiCl, and LiI.

The concentration of the lithium salt preferably ranges from 0.6 to 2.0 M, more preferably from 0.7 to 1.6 M. When the concentration of the lithium salt is less than 0.6 M, the electrolyte performance deteriorates due to its ionic conductivity. When the concentration of the lithium salt is greater than 2.0 M, the lithium ion mobility decreases due to an increase of the electrolyte viscosity. The lithium salt acts in a battery as a supply source of lithium ions, making the basic operation of a lithium secondary battery possible.

The non-aqueous organic solvent may include a carbonate, an ester, an ether, or a ketone. Examples of carbonates include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC). Examples of esters include γ-butyrolactone (γ-BL), decanolide, valerolactone, mevalonolactone, caprolactone, n-methyl acetate, n-ethyl acetate, n-propyl acetate, etc. Examples of ethers include dibutyl ether, etc., and examples of ketones include polymethylvinylketone. However, the non-aqueous organic solvent is not limited to the above solvent.

It is preferable to use a mixture of a chain carbonate and a cyclic carbonate. The cyclic carbonate and the chain carbonate are preferably mixed together in a volume ratio of 1:1 to 1:9. When the electrolyte includes the cyclic carbonate and the chain carbonate mixed in the volume ratio of 1:1 to 1:9, the electrolyte performance may be enhanced.

It is also preferable to use a mixture of ethylene carbonate and organic solvent with a low boiling point. Examples of the organic solvent with a low boiling point include dimethyl carbonate (DMC), diethyl carbonate (DEC), methylpropyl carbonate (MPC), ethylpropyl carbonate (EPC), methylethyl carbonate (MEC), propylene carbonate (PC), and butylene carbonate (BC).

In addition, the electrolyte of the present invention may include mixtures of the carbonate solvents and aromatic hydrocarbon solvents of Formula (2):

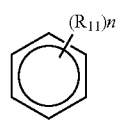

(2)

where $R_{11}$ is a halogen or a $C_1$ to $C_{10}$ alkyl, and n is an integer of 0 to 6.

Examples of aromatic hydrocarbon solvents include benzene, fluorobenzene, chlorobenzene, nitrobenzene, toluene, fluorotoluene, trifluorotoluene, and xylene. The carbonate solvents and the aromatic hydrocarbon solvents are preferably mixed together in a volume ratio of 1:1 to 30:1. When the electrolyte includes a carbonate solvent and an aromatic hydrocarbon solvent mixed with each other in the aforementioned volume ratio, the electrolyte performance may be enhanced.

The additive compound is represented by Formula (1):

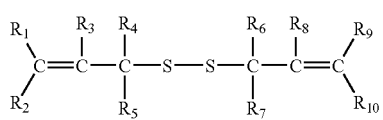

(1)

where $R_1$ to $R_{10}$ are independently selected from the group consisting of a hydrogen, alkyl, alkenyl, and alkynyl, preferably $C_1$ to $C_7$ alkyl, $C_2$ to $C_7$ alkenyl, and $C_2$ to $C_7$ alkynyl.

Examples of the additive compounds include allyl disulfide, methyl allyl disulfide, and ethyl allyl disulfide.

The additive compounds are added in an amount of 0.1 to 10 wt %, preferably 0.1 to 5 wt %, and more preferably 0.5 to 2 wt % based on the total amount of the electrolyte. The inhibition of the generation of gas inside a battery is not likely to occur when the compounds are used in an amount of less than 0.1 wt %. Battery performance such as initial charge/discharge efficiency and cycle life characteristics is deteriorated when the compound is used in an amount exceeding 10 wt %.

The additive compound is decomposed earlier than a carbonate-based organic solvent during initial charging to react with lithium ions resulting in the formation of an SEI film, thereby inhibiting the decomposition of the carbonate-based organic solvent. Therefore, the increase in the thickness of a lithium battery can be prevented during charging at room temperature or during high temperature storage after charging since the generation of gas caused by the decomposition of the carbonate-based organic solvent is inhibited during initial charging.

An electrolyte for a lithium secondary battery of the present invention is stable in the temperature range of −20 to 60° C., thereby maintaining stable characteristics of the battery even at a voltage of 4 V. An electrolyte of the present invention can be applied to all lithium secondary batteries including a lithium ion battery, lithium polymer battery, etc.

The present invention provides a lithium battery comprising the electrolyte. The lithium battery of the present invention uses a material that is capable of reversible intercalation/deintercalation of the lithium ions (lithiated intercalation compound) as a positive active material. Examples of the material that is capable of reversible intercalation/deintercalation of the lithium ions are a lithium-containing metal oxide or a lithium-containing calcogenide compound such as $LiCoO_2$, $LiNiO_2$, $LiMnO_2$, $LiMn_2O_4$, $LiNi_{1-x-y}CO_xM_yO_2$ ($0 \leq x \leq 1$, $0 \leq y \leq 1$, $0 \leq x+y \leq 1$, M is a metal such as Al, Sr, Mg, and La), $LiFeO_2$, and $V_2O_5$.

The lithium secondary battery of the present invention uses a material that is capable of reversible intercalation/deintercalation of the lithium ions, a material that is capable of reversibly forming a lithium-containing compound, a lithium metal, or a lithium-containing alloy, as a negative active material. Examples of a material that is capable of reversible intercalation/deintercalation of the lithium ions are carbonaceous materials such as crystalline or amorphous carbonaceous materials. Examples of crystalline carbonaceous material include natural graphite or artificial graphite such as mesocarbon fiber (MCF) and mesocarbon microbeads (MCMB). Examples of amorphous carbonaceous material include soft carbon (low-temperature calcinated carbon) which is obtained by heat-treating pitch at 1000° C., and hard carbon (high-temperature calcinated carbon) which is obtained by carbonizing polymer resin. It is preferable that the carbonaceous material has a $d_{002}$ interplanar distance of 3.35 to 3.38 Å, an Lc (crystallite size) measured by X-ray diffraction of more than 20 nm, and an exothermic peak of at least 700° C. The materials that can reversibly form a lithium-containing compound by a reaction with lithium ions include silicon (Si), titanium nitrate, and tin oxide ($SnO_2$). The lithium-containing alloy includes alloys of lithium and a metal selected from Al, Si, Sn, Pb, Zn, Bi, In, Mg, Ga, and Cd.

A lithium secondary battery is fabricated by the following process. Positive and negative electrodes are fabricated by coating a slurry including active materials on a current collector of an appropriate thickness and length. An electrode assembly is prepared by winding or laminating a positive electrode, a negative electrode, and a separator interposed between the positive and negative electrodes, then placing the electrode assembly into a battery case. An electrolyte of the present invention is injected into the case, and the upper part of the battery case is sealed. The separator interposed between the positive and negative electrodes is a polyethylene, polypropylene, or polyvinylidene fluoride monolayered separator; a polyethylene/polypropylene double layered separator; a polyethylene/polypropylene/polyethylene three layered separator; or a polypropylene/polyethylene/polypropylene three layered separator.

The lithium secondary battery of the present invention may be utilized to provide power in an electronic device. For example, the lithium secondary battery may be implemented in one of a cellular telephone, a portable telephone, a video game, a portable television, a portable computer, a notebook computer, a calculator, a computer, a telephone, an electronic toy, a digital clock, and the like.

The present invention is further explained in more detail with reference to the following examples. These examples, however, should not in any sense be interpreted as limiting the scope of the present invention.

EXAMPLES AND COMPARATIVE EXAMPLE

Example 1

Ethylene carbonate and ethylmethyl carbonate (EC/EMC) were mixed in a volume ratio of 1:1 in order to prepare a non-aqueous organic solvent. 1M $LiPF_6$ was added to the solvent, and 0.5 wt % allyl disulfide was further added based on the total weight of electrolyte to prepare an electrolyte.

Example 2

An electrolyte was prepared in the same manner as in Example 1, except that allyl disulfide was used in an amount of 1 wt % based on the total weight of electrolyte.

Example 3

An electrolyte was prepared in the same manner as in Example 1, except that allyl disulfide was used in an amount of 2 wt % based on the total weight of electrolyte.

Example 4

An electrolyte was prepared in the same manner as in Example 1, except that allyl disulfide was used in an amount of 5 wt % based on the total weight of electrolyte.

Example 5

An electrolyte was prepared in the same manner as in Example 1, except that methyl allyl disulfide was used instead of allyl disulfide.

Example 6

An electrolyte was prepared in the same manner as in Example 1, except that ethyl allyl disulfide was used instead of allyl disulfide.

Comparative Example 1

An electrolyte was prepared in the same manner as in Example 1, except that allyl disulfide was not added in Comparative Example 1.

Measurement of Decomposition-initiating Voltage

The decomposition-initiating voltage of the electrolytes according to Example 2 and Comparative Example 1 was measured by LSV (linear sweep voltametry). The decomposition-initiating voltages are represented in Table 1.

TABLE 1

|  | decomposition-initiating voltage (V) |
|---|---|
| Example 2 | 0.7 |
| Comparative Example 1 | 0.5 |

The conditions for measurement of the decomposition-initiating voltages were as follows:

working electrode: Pt; reference electrode: Li-metal; counter electrode: Li-metal; voltage range: 3V to 0V; scan rate: 0.1 mV/s.

As shown in Table 1, the electrolyte of Example 2 including allyl disulfide has a higher decomposition voltage than the electrolyte of Comparative Example 1 to which the allyl disulfide was not added. Accordingly, the electrolyte of Example 2 decomposes earlier during initial charging, and an SEI film-forming reaction occurs at the decomposition voltage.

Fabrication of Lithium Secondary Batteries

After mixing $LiCoO_2$ as a positive active material, polyvinylidenefluoride (hereinafter referred to as "PVdF") as a binder, and carbon as a conductive agent in a weight ratio of 92:4:4, a positive slurry was prepared by dispersing the mixture into N-methyl-2-pyrrolidone. The slurry was coated on a 20 μm thick aluminum foil, dried, and compressed, thereby manufacturing a positive electrode. After mixing crystalline artificial graphite as a negative active material with PVdF as a binder in a weight ratio of 92:8, a negative slurry was prepared by dispersing the mixture into N-methyl-2-pyrrolidone. The slurry was coated on a 15 μm thick copper foil, dried, and compressed, thereby manufacturing a negative electrode. Together with a 25 μm thick polyethylene separator, the manufactured electrodes were wound, and pressed, then placed into prismatic cans having the dimensions of 30 mm×48 mm×6 mm. Each of the electrolytes of the Examples 1 to 4 and Comparative Example 1 were injected into the cans, thereby completing the manufacture of the batteries.

Thickness Variations in the Batteries After Charging

The lithium secondary batteries, which were manufactured by injecting the electrolyte solutions of the Examples 1 to 4 and Comparative Example 1, were charged with an electric current of 170 mA to a charge voltage of 4.2 V under the condition of CC-CV, then allowed to sit for 1 hour, and the batteries were discharged to 2.5 V with an electric current of 170 mA, and left to sit for 1 hour. After repeating this procedure 3 times, the batteries were charged with an electric current of 425 mA to a charge voltage of 4.2 V for 2 hours and 30 minutes. The increases in the thicknesses of the batteries after charging relative to the thicknesses measured after assembly of the batteries are represented as the rates of increases as shown in Table 2.

TABLE 2

|  | The rates of increase in the thicknesses of the batteries after charging (%) |
|---|---|
| Example 1 | 4.5 |
| Example 2 | 4.4 |
| Example 3 | 4.1 |
| Example 4 | 6.0 |
| Comparative Example 1 | 7.9 |

As shown in Table 2, the increases in thickness of the lithium ion cells into which the electrolytes of Examples 1 to 4 were injected were substantially less than that of the lithium ion cell into which the electrolyte of Comparative Example 1 was injected.

Cycle Life Characteristics

Figure 2:
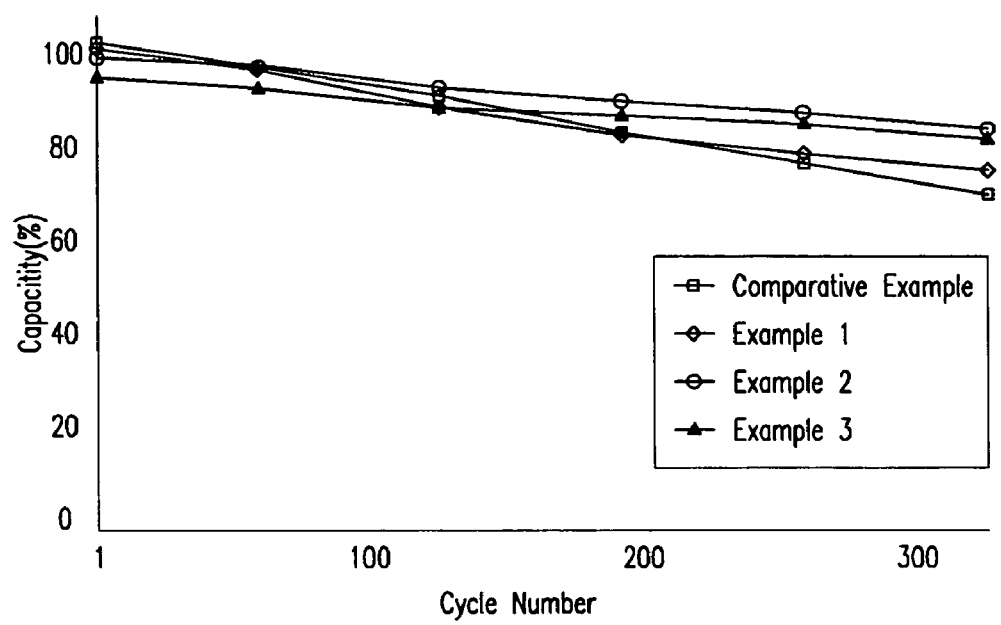
FIG. 2 is a graph illustrating cycle life characteristics of the battery cells according to Examples of the present invention, and Comparative Example.

The lithium secondary batteries, which were manufactured by injecting the electrolytes of Examples 1 to 3 and Comparative Example 1, were charged with 800 mA to a charge voltage of 4.2 V under the condition of constant current-constant voltage (CC-CV), and the batteries were discharged with 800 mA to a cut-off voltage of 2.75 V. The charge and discharge were repeated for 300 cycles. The cycle life characteristics of the cells according to Examples 1 to 3 and Comparative Example 1 were measured and the results are shown in FIG. 2. As shown in FIG. 2, the capacity of the cell of Comparative Example 1 was significantly reduced during the charge and discharge cycles, while the initial capacities of Examples 1 to 3 were not significantly reduced. That is, the cycle life characteristics of the cells of Examples 1 to 3 were better than that of Comparative Example 1.

An allyl disulfide compound added to an electrolyte of the present invention is decomposed earlier than a carbonate-based organic solvent during initial charging, thus forming an SEI film to inhibit a carbonate-based organic solvent from being decomposed. Therefore, a lithium secondary battery to which the electrolyte of the present invention is applied decreases the internal pressure of batteries and prevents the thickness of batteries from increasing during charging at room temperature or during high temperature storage after charging. That is, these effects are realized by inhibiting the generation of gas caused by the decomposition of the carbonate-based organic solvent during initial charging.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An non-aqueous electrolyte for a lithium secondary battery, comprising:
   a lithium salt;
   a non-aqueous organic solvent; and
   a compound represented by Formula (1):

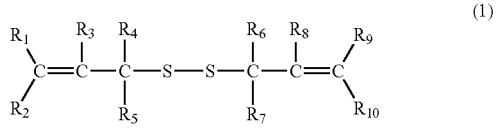

(1)

where $R_1$ to $R_{10}$ are independently selected from the group consisting of a hydrogen, alkyl, alkenyl, and alkynyl.

2. The non-aqueous electrolyte for a lithium secondary battery according to claim 1, wherein the lithium salt is at least one selected from the group consisting of LiPF6, LiBF4, LiSbF$_6$, LiAsF$_6$, LiClO$_4$, LiCF$_3$SO$_3$, Li(CF$_3$SO$_2$)$_2$N, LiC$_4$F$_9$SO$_3$, LiSbF$_6$, LiAlO$_4$, LiAlCl$_4$, LiN(C$_x$F$_{2x}$+1SO$_2$)(C$_y$F$_{2y}$+1SO$_2$) wherein x and y are natural numbers, LiCl, and LiI.

3. The non-aqueous electrolyte for a lithium secondary battery according to claim 2, wherein a concentration of the lithium salt is in the range of 0.6 to 2.0 M.

4. The non-aqueous electrolyte for a lithium secondary battery according to claim 1, wherein the non-aqueous organic solvent is at least one selected from the group consisting of carbonate, ester, ether, and ketone.

5. The non-aqueous electrolyte for a lithium secondary battery according to claim 4, wherein the carbonate is selected from the group consisting of dimethyl carbonate (DMC), diethyl carbonate (DEC), dipropyl carbonate (DPC), methylpropyl carbonate (MPC), ethylpropyl carbonate (EPC), methylethyl carbonate (MEG), ethylene carbonate (EC), propylene carbonate (PC), and butylene carbonate (BC).

6. The non-aqueous electrolyte for a lithium secondary battery according to claim 4, wherein the carbonate comprises a mixed solvent of a cyclic carbonate and a chain carbonate.

7. The non-aqueous electrolyte for a lithium secondary battery according to claim 1, wherein the organic solvent comprises a mixed solvent of a carbonate solvent and an aromatic hydrocarbon solvent.

8. The non-aqueous electrolyte for a lithium secondary battery according to claim 7, wherein the aromatic hydrocarbon solvent comprises a compound represented by Formula (2):

(2)

where $R_{11}$ is a halogen or a $C_1$ to $C_{10}$ alkyl, and n is an integer of 0 to 6.

9. The non-aqueous electrolyte for a lithium secondary battery according to claim 8, wherein the aromatic hydrocarbon solvent comprises at least one selected from the group consisting of benzene, fluorobenzene, toluene, fluorotoluene, trifluorotoluene, xylene, and mixtures thereof.

10. The non-aqueous electrolyte for a lithium secondary battery according to claim 1, wherein the compound represented by Formula 1 comprises at least one selected from the group consisting of allyl disulfide, methyl allyl disulfide, ethyl allyl disulfide and mixtures thereof.

11. The non-aqueous electrolyte for a lithium secondary battery according to claim 1, wherein an amount of the compound represented by Formula 1 is 0.1 to 10 wt % based on a total weight of the electrolyte.

12. The non-aqueous electrolyte for a lithium secondary battery according to claim 11, wherein an amount of the compound represented by Formula 1 is 0.1 to 5 wt % based on a total weight of the electrolyte.

13. The non-aqueous electrolyte for a lithium secondary battery according to claim 12, wherein an amount of the compound represented by Formula 1 is 0.5 to 2 wt % based on a total weight of the electrolyte.

14. The non-aqueous electrolyte for a lithium secondary battery according to claim 1, in a combination comprising:
   a positive electrode including a positive active material being capable of reversible intercalation/deintercalation of lithium ions; and
   a negative electrode including a negative active material selected from the group consisting of a material that is capable of reversible intercalation/deintercalation of lithium ions, a material that is capable of reversibly forming a lithium-containing compound, a lithium metal, and a lithium-containing alloy.

15. The non-aqueous electrolyte for a lithium secondary battery according to claim 14, wherein the lithium secondary battery is selected from the group consisting of a lithium ion battery and a lithium polymer battery.

16. The non-aqueous electrolyte for a lithium secondary battery according to claim 14, wherein the lithium salt is at least one selected from the group consisting of LiPF6, LiBF4, LiSbF$_6$, LiAsF$_6$, LiClO$_4$, LiCF$_3$SO$_3$, Li(CF$_3$SO$_2$)$_2$N, LiC$_4$F$_9$SO$_3$, LiSbF$_6$, LiAlO$_4$, LiAlCl$_4$, LiN(C$_x$F$_{2x}$+1SO$_2$)(C$_y$F$_{2y}$+1SO$_2$) wherein x and y are natural numbers, LiCl, and LiI.

17. The non-aqueous electrolyte for a lithium secondary battery according to claim 16, wherein a concentration of the lithium salt is in the range of 0.6 to 2.0 M.

18. The non-aqueous electrolyte for a lithium secondary battery according to claim 14, wherein the non-aqueous organic solvent is at least one selected from the group consisting of carbonate, ester, ether, and ketone.

19. The non-aqueous electrolyte for a lithium secondary battery according to claim 18, wherein the carbonate is selected from the group consisting of dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC).

20. The non-aqueous electrolyte for a lithium secondary battery according to claim 18, wherein the carbonate comprises a mixed solvent of a cyclic carbonate and a chain carbonate.

* * * * *